June 6, 1967 A. TEMS ET AL 3,324,226
COMPONENT MOUNTINGS

Filed Feb. 14, 1966 5 Sheets-Sheet 1

INVENTORS.
ADAM TEMS
EDWARD GOODMAN
MILTON I. ROSS
BY Morris Michael Marks
ATTORNEY.

June 6, 1967  A. TEMS ET AL  3,324,226
COMPONENT MOUNTINGS

Filed Feb. 14, 1966  5 Sheets-Sheet 3

INVENTORS.
ADAM TEMS
EDWARD GOODMAN
MILTON I. ROSS

BY Morris Michael Marks

ATTORNEY.

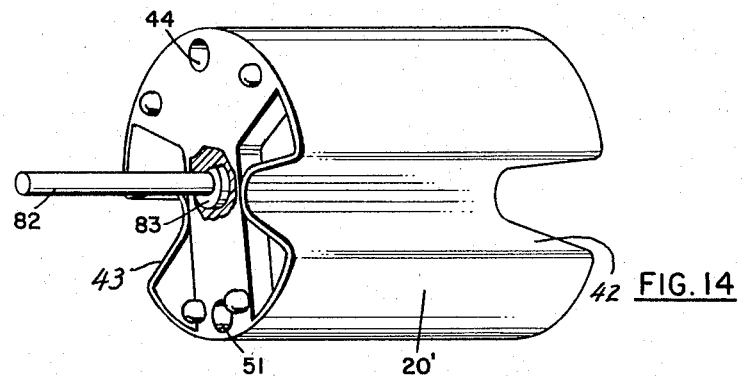
FIG. 14
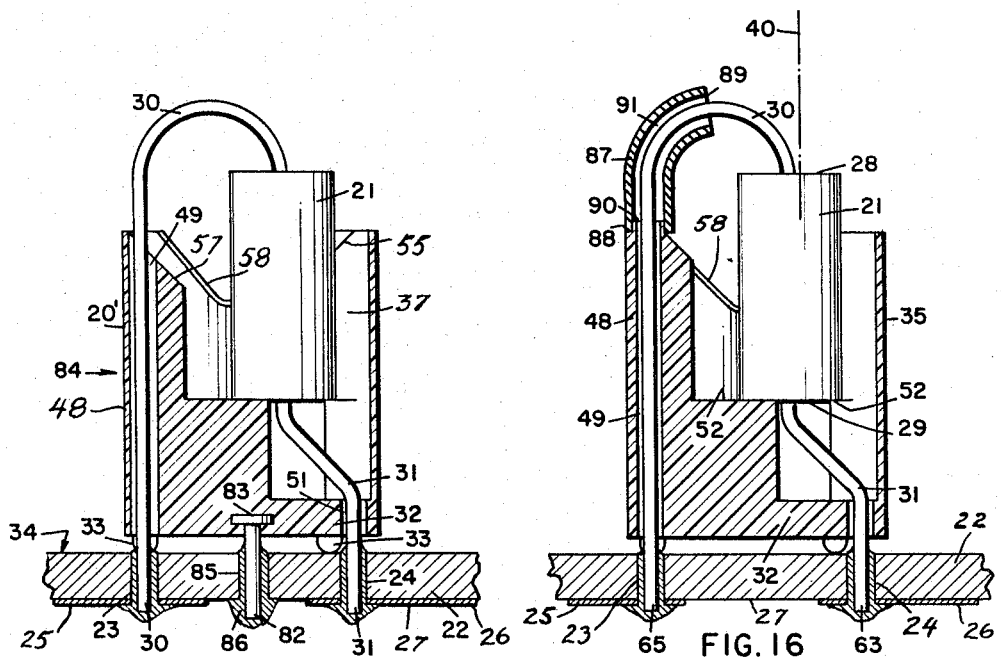
FIG. 15
FIG. 16
INVENTORS.
ADAM TEMS
EDWARD GOODMAN
MILTON I. ROSS
BY *Morris Michael Marks*
ATTORNEY.

June 6, 1967  A. TEMS ET AL  3,324,226
COMPONENT MOUNTINGS
Filed Feb. 14, 1966  5 Sheets-Sheet INVENTORS.
ADAM TEMS
EDWARD GOODMAN
MILTON I. ROSS
BY Morris Michael Marks
ATTORNEY.

United States Patent Office 3,324,226
Patented June 6, 1967

3,324,226
COMPONENT MOUNTINGS
Adam Tems, Cherry Hill, N.J., and Edward Goodman, Feasterville, and Milton I. Ross, Bala Cynwyd, Pa.; said Tems and said Goodman assignors to The Ross Manufacturing Company, Southampton, Pa., a corporation of Pennsylvania
Filed Feb. 14, 1966, Ser. No. 527,306
20 Claims. (Cl. 174—52)

Our invention relates to mountings for electronic components, such for instance as components to be mounted on printed circuit boards or on chassis.

In the customary manner of mounting such components on P-C boards, the component is supported by its leads, which pass through orifices in the P-C board and are soldered to the conductive pattern on the underside of the P-C board. When the components are mounted in a horizontal position, that is, parallel to a horizontally disposed P-C board, an acceptable amount of rigidity may be established because the support is shared substantially equally between the leads at each end thereof. But when the component is mounted vertically, e.g. perpendicular to the P-C board, bending moments would be disposed substantially along the same axis as that of the supporting leads, and rigidity of support is thereby sharply reduced. One method of reducing such bending strain has been to draw the lower end of the component tightly against the P-C board or suitable mounting pad disposed on such board; but this may impose an undesirable strain on the lead. Moreover, when it is necessary to pass a lead from the upper end of the vertical component through a P-C board orifice disposed beneath the lower end of the same component, it is not possible efficaciously to hold the component in a vertical position. Also, in cases where a vertical component is supported by one or more leads extending from its lower end, the upper portion of the vertical component may serve as a lever to impose harmful strain on the leads or the component, should force inadvertently be administered against the component. Furthermore, when a vertical component is supported by one or more leads passing through orifices in a P-C board, it is of importance that the leads do not emerge from the component at too great an angle, lest deleterious strain be imposed on the component or its leads.

In the case of components mounted on a metal chassis, it is necessary to provide means for insulating the component from the chassis while at the same time providing a rigid mounting. Attempts have been made in the past to do this by disposing a hollow insulation in a hole in the chassis and force fitting the component therein. This may require careful trimming or dulling of the sharp edges of the hole. Even so, this method may result in harm to the component, damage to the insulation, and uncertainty in ultimate positioning of the component. Moreover, it often requires a mechanical assembly operation, for manual force fitting on a mass production basis is tiring and tends to be inadequate for the force required.

One object of our invention therefore is to provide a mounting for a vertical component, which is adapted to support the component on a P-C board or chassis with a minimum of strain on the component leads.

Another object of our invention is to provide a mounting for a vertical-mounted component, which is adapted dependably to hold the component in vertical position on a P-C board or chassis, regardless of vibration, jarring or the like.

A further object of our invention is to provide a mounting for a vertical component which is adapted to hold the component and its leads in proper position with respect to a P-C board or chassis.

Another object of our invention is to provide a mounting for a vertical component which is adapted to provide a resilient cushion for said component in a manner to protect the component and its leads against deleterious impact, jarring or vibration.

A further object of our invention is to provide a mounting for a vertical component which is so constructed as to guide the component and its leads into their proper position with respect to the mounting and to the P-C board or chassis as said component is moved into its ultimate position in the mounting, during the assembling operation.

Another object of our invention is to provide a substantially "universal" mounting which is adapted to receive and to hold components of various sizes and shapes in proper position on P-C boards or other circuitry bases having lead-receiving portions spaced at various distances.

A further object of our invention is to provide a mounting for a vertical component, which is so constructed as to eliminate the necessity of bending the component leads prior to mounting the component.

Another object of our invention is to provide a mounting adapted to secure a component to a metal chassis, in fully insulated relation thereto, in a cushioned manner, in a predetermined position with respect to the chassis, with a minimum of labor, and without resort to the conventional force fit.

A further object of our invention is to provide a component mounting which is inexpensive to make, efficient and dependable in use.

For the purpose of illustrating our invention, we have shown in the accompanying drawings forms thereof which are at present preferred by us, since the same have been found to give satisfactory and reliable results, although it is to be understood that the various instrumentalities of which our invention consists can be variously arranged and organized, and that our invention is not limited to the precise arrangements and organizations of the instrumentalities as herein shown and described.

Referring now to the drawings in which like reference characters indicate like parts:

FIGURE 14 represents a perspective view illustrating the bottom and a side of a mounting device of a further modified construction and embodying our invention.

FIGURE 15 represents a vertical sectional view of the mounting device illustrated in FIGURE 14, and illustrating the same assembled with a component and a P-C board, and embodying our invention.

FIGURE 16 represents a vertical sectional view illustrating a mounting device of another modified construction, showing the same assembled with a vertical component and a P-C board, and embodying our invention.

Figure 1:
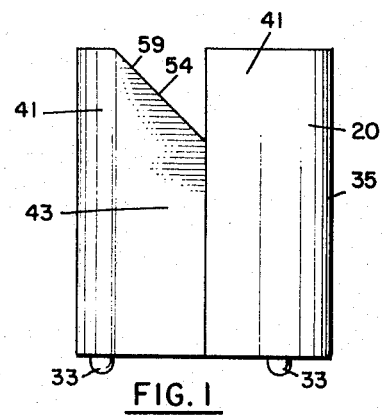
FIGURE 1 represents an elevational view, illustrating a mounting device embodying our invention.
Figure 2:
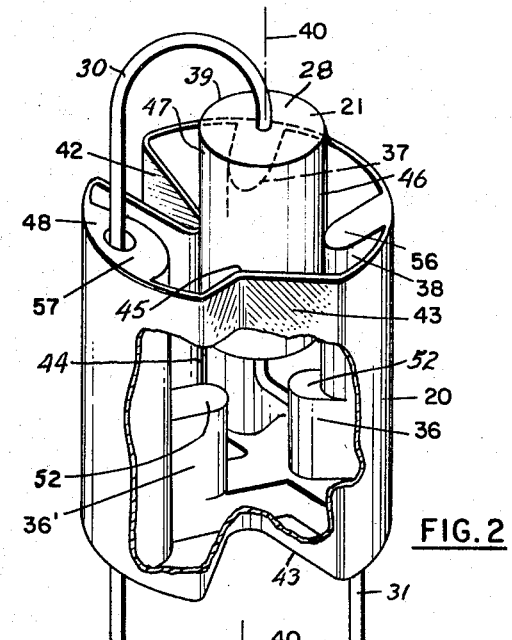
FIGURE 2 represents a perspective view, partly broken away, illustrating a mounting device receiving a vertical component during the assembling operation, and embodying our invention.
Figure 3:
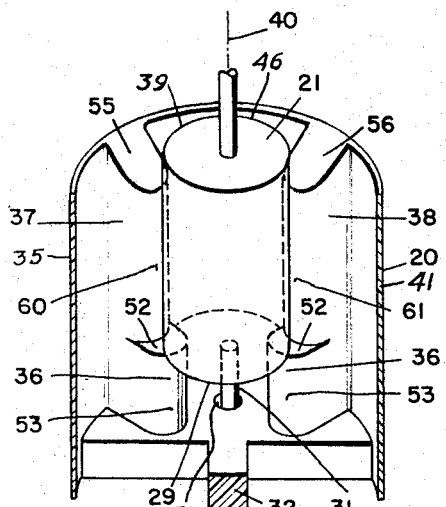
FIGURE 3 represents a vertical perspective view, partly in section, illustrating the interior of one side of a mounting device, and showing the same in relation to a vertical component mounted therein, and embodying our invention.
Figure 4:
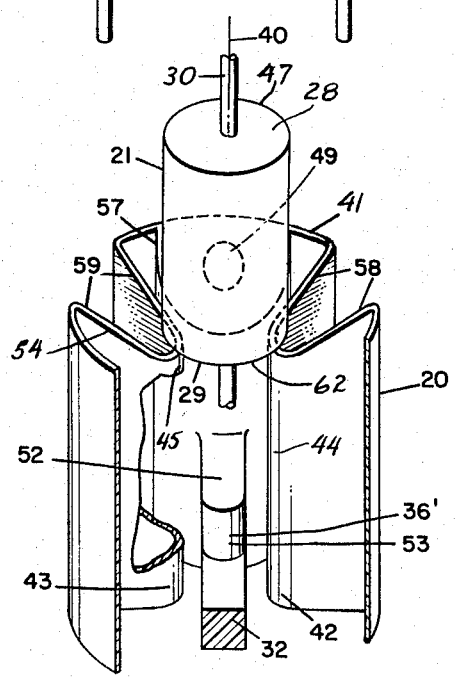
FIGURE 4 represents a vertical perspective view, partly in section, illustrating the interior of an opposed side of a mounting device, and showing the same in relation to a vertical component during one stage of the assembling operation, and embodying our invention.
Figure 5:
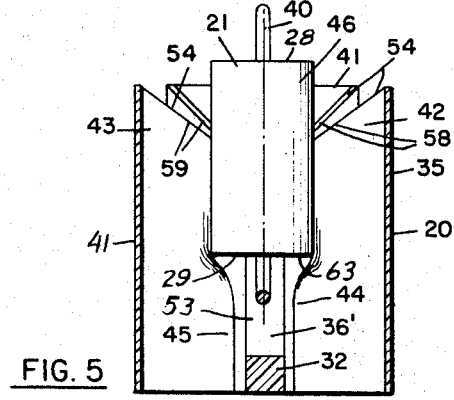
FIGURE 5 represents a vertical sectional view illustrating the side of the mounting device shown in FIGURE 4, and illustrating the same in its condition after receiving a vertical component during the assembling operating, and embodying our invention.
Figure 6:
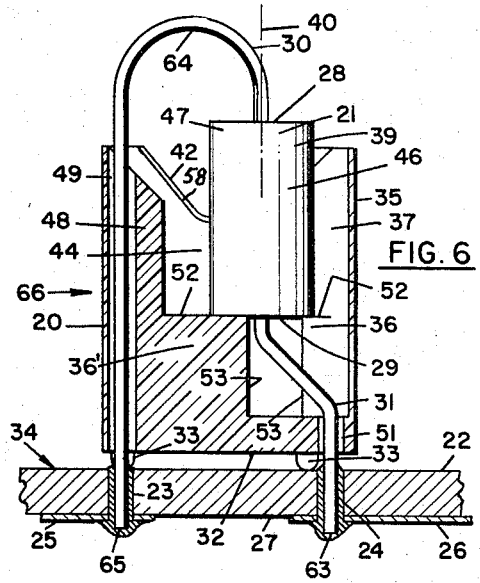
FIGURE 6 represents a vertical sectional view illustrating the mounting device and component illustrated in FIGURE 2, showing the same fully assembled with a P-C board.
Figure 7:
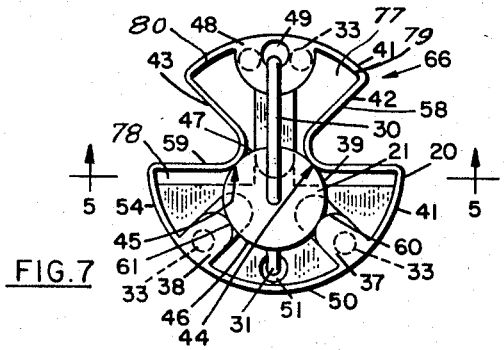
FIGURE 7 represents a plan view illustrating the mounting device and component illustrated in FIGURE 2.
Figure 8:
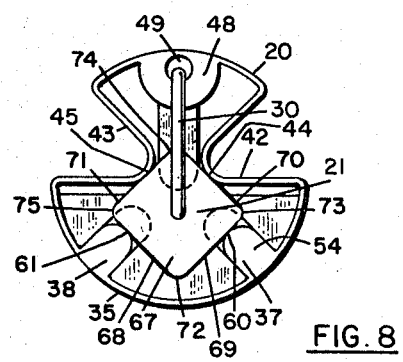
FIGURE 8 represents a plan view illustrating the mounting device shown in FIGURE 1, assembled with a component of rectangular cross-section, and embodying our invention.
Figure 9:
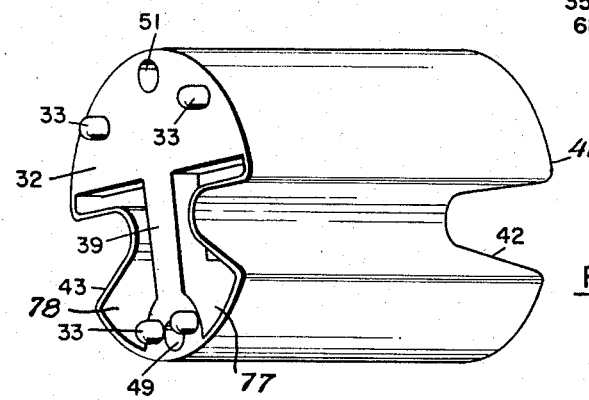
FIGURE 9 represents a perspective view illustrating the bottom and a side of a component mounting device embodying our invention.

Our invention is adapted for use in mounting vertical components on any suitable base; and for purposes of illustration only, the mounting 20 is shown as used in conjunction with a vertical component 21 and a base consisting of a P-C board 22 having orifices 23, 24 passing therethrough, respectively in the vicinity of conductors 25, 26 disposed on the lower face 27 of the P-C board 22. The component 21 may be of any shape, such for instance as cylindrical (as illustrated for instance in FIGURES 2-7), rectangular (as illustrated in FIGURE 8), or otherwise.

The component 21 may have a top face 28, and comprises a bottom face 29. A top lead 30 may extend upwardly from the top face 28, and a bottom lead 31 may extend downwardly from the bottom face 29. It is to be understood however that our invention is not limited to use with components having oppositely disposed leads, or to components having only one lead extending from an end thereof.

According to our invention, the mounting 20 may be made of any suitable material such for instance as nylon, polypropylene, rubber, or other suitable resilient material. The mounting 20 preferably comprises a base portion 32 which may if desired be disposed on suitable spacer members such as the feet 33 adapted to space the base portion 32 from the upper face 34 of the P-C board 22. A receptacle portion 35 projects upwardly from the base portion 32 and comprises one or more steps 36, 36' upwardly projecting from the base portion 32 and adapted to support peripheral portions of the bottom face 29 of the component 21. Preferably substantially rigid posts 37, 38 extend upwardly from the base portion 32 and are adapted to bear against laterally spaced portions of the outer wall 39 of the component 21, disposed on one side 46 of the vertical axis 40 of the component 21. A resilient, preferably substantially tubular wall 41 extends upwardly from the base portion 32. The wall 41 is preferably contoured into one or more inwardly projecting folds 42, 43 with the respective inner faces 44, 45 of the bights thereof adapted to bear against portions of the side 47 of the wall 39 disposed on the opposite side of the vertical axis 40 of the component 21. A hollow post 48 may be disposed along the tubular wall 41 intermediate the folds, 42, 43, the interior of said hollow post defining a channel 49 for the top lead 30 in a manner hereinafter to be described.

In a preferred form, the tubular wall 41, base portion 32, feet 33, steps 36, 36', posts 37, 38 and the hollow post 48, are formed integral. In this manner, the web 50 of that portion of the tubular wall 41 disposed between adjacent posts 37 and 38 aids in supporting said posts 37, 38 against lateral displacement, the posts 37 and 48 provide supporting members for the inward fold 42, and the posts 38 and 48 provide supporting members for the inward fold 43, the posts 37, 38, 48 form stiffening ribs or a frame for the resilient tubular wall 41 at portions thereof where additional strength is needed, and the steps 36, 36' extending upwardly from the base 32 and inwardly from the posts 37, 38 add rigidity to the mounting 20 in the lower or foundational portion thereof. One or more channels 51 extend downwardly through the base portion 32, and together with the channel 49 are adapted to be disposed respectively in registry with the orifices 24, 23 of the P-C board 22 when the mounting device 20 is in its ultimate position thereon.

The steps 36, 36' each comprises a platform 52 and a riser portion 53 leading downwardly from the platform 52 to the base portion 32, said risers 53 being spaced in a manner to allow the passage therebetween of the bottom lead 31 extending from the bottom face 29 of the component 21 to and through the channel 51 when said component 21 is positioned on the steps 36, 36'. In this manner, the bottom lead 31 may be guided away from the longitudinal axis 40 of the component 21 and into and through the orifice 24 of the P-C board 22 without imposing undue bending stress on the lead 31 at the bottom face 29 of the component 21. The angle or curvature of displacement required to thus guide the lead 31 may also be rendered smaller by extending the distance of the platform 52 above the base 32.

Also, in a preferred form, the upper surface 54 of receptable portion 35 is substantially inverse conical. Thus, the upper faces 55 and 56 respectively of the posts 37 and 38, the upper face 57 of the hollow post 48, the upper edges 58 and 59 respectively of the inward folds 42 and 43 are all inwardly and downwardly inclined toward the vertical axis 40. There is thus provided camming surfaces 55, 56, 57, 58 and 59, adapted to guide the bottom face 29 of the component 21 downwardly into proper position with respect to the mounting 20 as the component 21 is thrust inwardly into the receptacle portion 35 thereof. In this operation, the bottom face 29 is led past the upper faces 55 and 56, and along the inner faces 60 and 61 respectively of the rigid posts 37 and 38 until the bottom face 29 rests upon the platforms 52 of the steps 36, 36'. In so doing, the bottom face is also led downwardly along the upper edges 58, 59 respectively of the inwardly projecting resilient folds 42, 43 against increasing resistance thereform as said folds extend beneath the bottom face 29 while the outer wall 39 of the component 21 bears against the inner faces 60 and 61 respectively of the rigid posts 37 and 38. The inwardly projecting folds 42 and 43 being resilient however, the perimeter 62 of the bottom face 29 bears against the downward and inward slope of the upper edges 58, 59 operably to urge the folds 42 and 43 outwardly against the inwardly directed resilient forces thereof, thereby to displace the inner faces 44 and 45 of the bights of the folds 42, 43 and thus to permit the further downward advance of the component 21 until the bottom face 29 thereof rests upon the platforms 52 of the steps 36, 36'. The component 21 is thus gripped tightly between the displaced bights 44 and 45, and the inner faces 60 and 61 of the rigid posts 37 and 38, while the component is supported against further downward displacement, by the platforms 52 of the steps 36, 36'.

In the assembling operation, the bottom lead 31 is first inserted into the receptacle portion 35 and into and through the channel 51. The component is then downwardly urged into the receptacle portion 35 as above described, until the bottom face 29 rests upon the platforms 52. The platforms 52 being preferably spaced from the base portion 32 in a substantial distance, the angle of lateral displacement of the lead 31 is kept substantially small, and the downward thrust of the component 21 therefore imposes only minimal bending moments on the bottom lead 31 as the component 21 is brought to rest upon the platforms 52 while the bottom lead 31 extends through the channel 51 and projects downwardly from the base portion 32 to an end portion 63.

The top lead 30 is then reversely bent about an arc 64 and is led downwardly through the channel 49 of the hollow post 48 until the end 65 of the top lead 30 projects downwardly from the base portion 32.

If desired, the top lead 30 may be reversely bent as at 64 before inserting the component 21 into the mounting 20, and the end 65 led downward through the channel 49 at the same time the component 21 is urged downwardly into the receptacle 35. In either case, undue stress on the top lead 30 is avoided.

When the component is thus disposed in the receptacle 35 with the leads 30 and 31 projecting downwardly from the base portion 32 of the mounting, the component 21 and the mounting 20 form an assembled unit which may be manipulated as a module 66. Thus, the mounting 20 may be held and maneuvered into position whereby the leads 30 and 31 extend through the respective orifices 23, 24 of the P-C board 22 until the respective ends 65, 63 are in proper position for soldering them to the respective conductors 25, 26 on the P-C board 22. Upon such soldering, the assembly of the module 66 with the P-C board 22 is complete.

In FIGURE 8 is illustrated the use of the mounting 20 with a component 67 having a shape other than cylindrical. Thus the component 67 is illustrated as being of rectangular cross-section with flat side surfaces 68, 69, 70 and 71, and angular portions 72, 73, 74 and 75 being formed between adjacent flat surfaces. Such component is inserted into the receptacle portion 35 by disposing the angular portions 72, 73, 74 and 75 between adjacent retaining portions of the receptacle portion 35. Thus, the angular portion 72 is disposed between the rigid posts 37 and 38, the angular portion 73 is disposed between the rigid post 37 and the inwardly projecting fold 42, the angular portion 74 is disposed between the inwardly projecting folds 42 and 43, and the angular portion 75 is disposed between the inwardly projecting fold 43 and the rigid post 38. In this manner, the flat faces 68 and 69 bear against the respective inner faces 61 and 60 of the rigid posts 38 and 37, and the flat faces 70 and 71 bear respectively against the inner faces of the resilient bights 44, 45 of the respective inwardly projecting folds 42 and 43.

Figure 12:
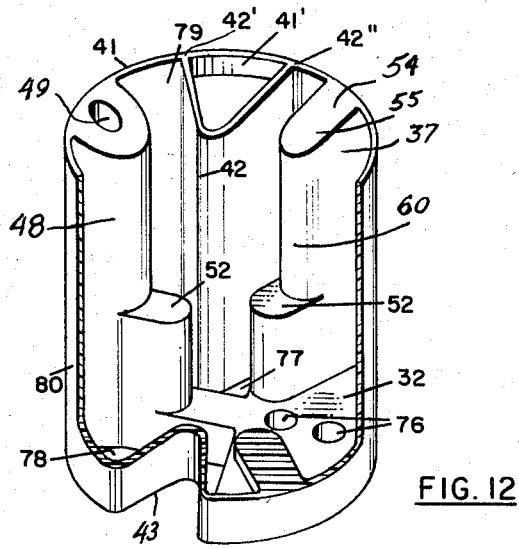
FIGURE 12 represents a vertical perspective view, partly broken away, illustrating a mounting device of modified construction, and embodying our invention.
Figure 11:
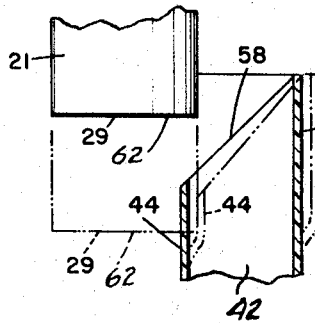
FIGURE 11 represents a vertical diagrammatic view illustrating the deformation which takes place during the insertion of a component in a mounting device embodying our invention.

In FIGURE 12 is illustrated a modified construction, wherein a plurality of channels 76 are provided through the base portion 32 in place of the channel 51, and also means are provided for restricting the displacement of the bights and thereby increasing their grip on the component. By the plurality of channels 76, means are provided for accommodating various spacing of orifices 23, 24 in the P-C board 22. As indicated above, the spacing of the platforms 52 from the base portion 32 assures minimal strain on the bottom lead 31 regardless of the location of the channel 76 through which it passes in the base portion 32. The channels 76 may also be disposed through the base portion 32 in proper position for guiding the bottom leads 31 of component 21 in cases where such components have a plurality of bottom leads. Moreover, such plurality of bottom leads may also extend, if desired, through the openings 77, 78 between the base portion 32 and the portions 79 and 80 of the wall 41 respectively adjacent the inwardly projecting folds 42, 43 thereof.

Such openings 77, 78, in all the forms of our invention, have the added advantage of providing room for the displacement of the folds 42, 43 into component-gripping position when the component 21 is inserted in the mounting 20. While two such folds 42, 43 are shown, it is to be understood that any desired number may be used in any of the forms of our invention herein illustrated.

Figure 20:
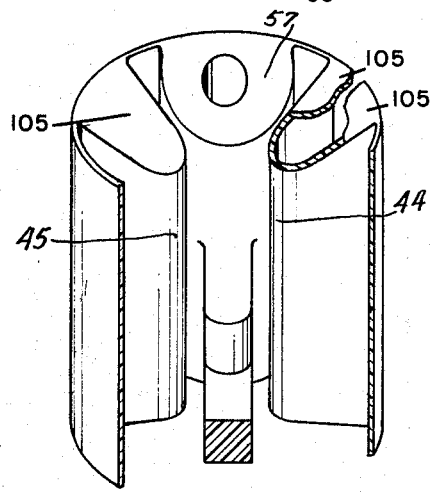
FIGURE 20 represents a perspective view, partly broken away, of a mounting device of another modified construction, embodying our invention.

If desired, a suitable link 41' may be provided for either or both the folds 42, 43. Such link 41' may for instance be disposed across the top of the fold 42, with both end portions 42' and 42" secured to the tubular wall 41 at portions thereof immediately adjacent the fold 42. A suitable link 41' may similarly be disposed across the base of the fold 43. In a preferred form, the link 41' and tubular wall 41 are formed integral. In operation, as the component is moved into position within the mounting 20, the fold bights are urged outwardly but the tubular wall 41 is inhibited from outward distension by the links 41'. The resilient folds however will yield to the displacement by the downwardly advancing component, with the bights spreading and providing greater bearing surface against the component, while applying greater gripping force thereagainst. While the link 41' is shown as a linear member, it may also be of any other desired shape, as for instance a web 105 extending between the reversely bent upper edges 59 of the fold, as illustrated in FIGURE 20.

Figure 13:
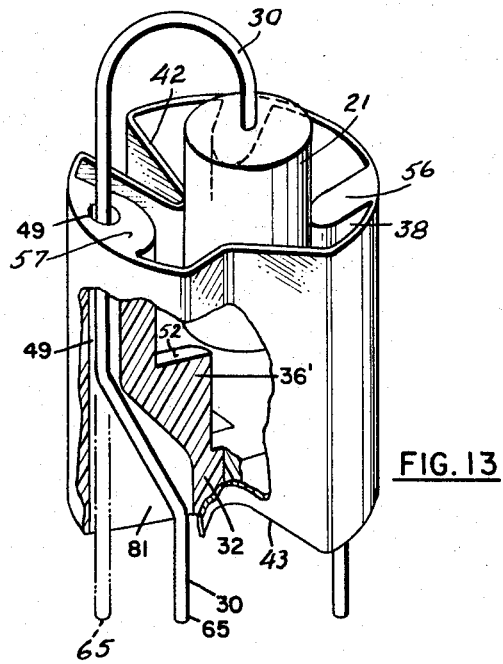
FIGURE 13 represents a perspective view, partly broken away, illustrating a mounting device of another modified construction and showing the same in conjunction with a component during the assembling operation, and embodying our invention.

In FIGURE 13 is illustrated another modified construction, whereby provision is made for various locations of orifices 23 for reception of the top lead 30. In this construction, the channel 49 is expanded at its lower portion into a slot 81 extending through the base portion 32 and the step 36'. Thus, provision is made for lateral displacement of the end 65 of the top lead 30 without imposition of undue stress thereon.

In FIGURES 14 and 15 are illustrated a further modified construction of our invention wherein provision is made for securing the modules to the P-C board 22 without imposing any supporting strain on the leads 30, 31. In this modification, there is provided a pin 82 having a head 83 embedded in the base portion 32 of the mounting 20 with the pin 82 projecting downwardly from said base portion 32. The pin 82 and preferably integral head 83 may be disposed as an insert in the molding of the mounting 20' which is otherwise substantially similar to the mounting 20. There is thus formed a module 84 comprising the component 21 inserted in place within the mounting 20', with the leads 30 and 31 projecting downwardly from the base portion 32 thereof, and the pin 82 also projecting downwardly from said base portion 32. The module 84 may be assembled with the P-C board 22 by passing the leads 30 and 31 downwardly through the respective channels 23 and 24, and the pin 82 through a channel 85 extending vertically through the P-C board 22. The pin 82 and leads 30, 31 may all be soldered to the P-C board in the same soldering operation. There being no conductors on the lower face 27 of the P-C board 22 in the immediate vicinity of the pin 82, the solder will adhere to the pin 82 in a manner to form a knob or protuberance 86 about the lower end thereof beneath the channel 85, and the pin is completely insulated from the circuit. In this manner, the module 84 is securely held to the P-C board 22 by the pin 82, knob 86 holding said pin 82 to the P-C board 22, and feet 33 or other bottom edge portion of the mounting 20' adapted to bear against the upper face 34 of the P–C board 22. If desired, two such pins 82 may be used for greater rigidity.

In FIGURE 16 is illustrated another modified construction embodying our invention. In this construction, means are provided for insulating the top lead 30 during a major portion thereof between the top face 28 of the component 21 and the channel 49 in the hollow post 48. In this modification suitable tubing 87 is provided having a lower end region 88, and an upper end region 89. The upper end region 89 is preferably bent toward the vertical axis 40, and the lower end region 88 is secured as for instance by means of a boss 90 to the hollow post 48 with the interior 91 of the tubing 87 in registry with the channel 49. The upper lead 30 may then be inserted into the tubing 87 and downwardly through the channel 49 while the component 21 is urged downwardly into the receptacle portion 35 until the bottom face 29 rests upon the platforms 52 whereupon the ends 65 and 63 respectively of the leads 30 and 31 project downwardly from the base portion 32.

Figure 17:
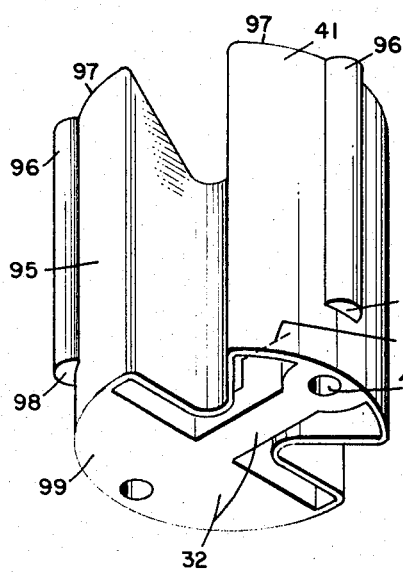
FIGURE 17 represents a perspective view of a mounting device of a further modified construction, and embodying our invention.
Figure 18:
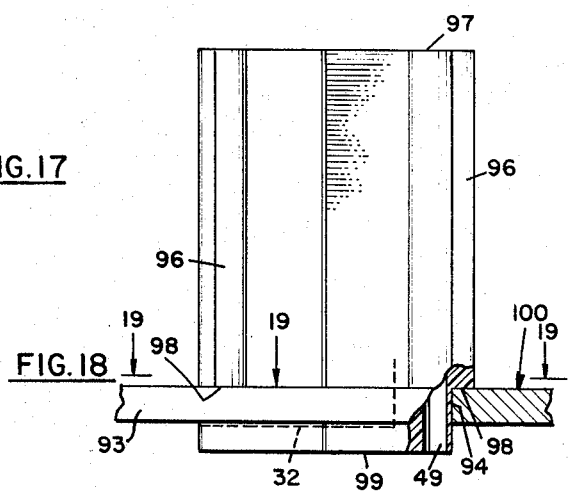
FIGURE 18 represents an elevation view, partly broken away, of the mounting device illustrated in FIGURE 17, illustrating the same mounted in a chassis.
Figure 19:
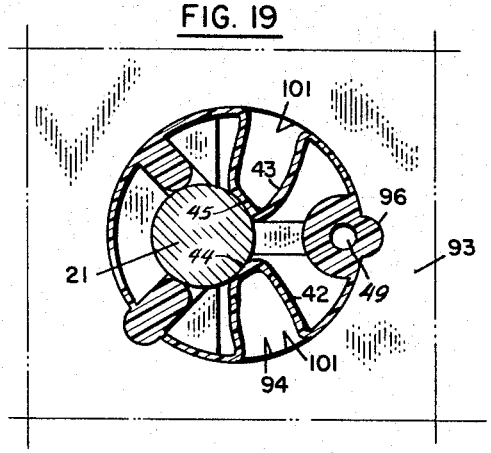
FIGURE 19 represents an enlarged sectional view taken generally along the lines 19—19 of FIGURE 18.

In FIGURES 17–19 inclusive is illustrated another modified construction embodying our invention. This modification is particularly adapted for use with chassis 93 on which it is desired to mount components for circuitry connection other than that afforded by a conventional printed circuit board. In this modification, a mounting 95 may be provided having a formation substantially similar to that of any of the construction of mounting hereinabove described, as for instance the construction illustrated in FIGURES 1–9 inclusive. One or more projections may extend exteriorly of the tubular wall 41, and may if desired be in the form of a ridge 96 extending longitudinally along said wall 41 from the vicinity of the upper edge region 97 thereof to a lower, bearing surface 98 spaced from the bottom 99 a distance substantially equal to or greater than the distance between said bottom 99 and the platform 52, and preferably greater than the sum of the thickness of the chassis 93 plus the thickness of the base 32. A channel 94 of a diameter preferably slightly greater than the diameter of the tubular wall 41 is punched out of, or otherwise disposed through, the chassis 93.

Figure 10:
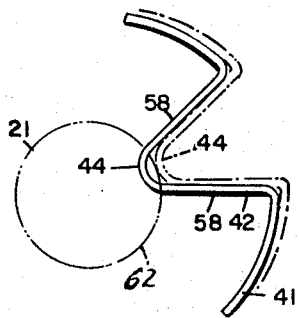
FIGURE 10 represents a diagrammatic plan view illustrating the deformation which takes place during the insertion of a component in a mounting device embodying our invention.

In operation, the base portion 32 of the mounting 95 is passed through the channel 94, until the lower faces 98 of the ridges 96 abut the upper face 100 of the chassis 93. The component 21 is then inserted into the interior of the mounting 95 in the manner hereinabove described. In so doing, the folds 42 and 43 tend to be deformed outwardly substantially as illustrated in FIGURE 10, but that portion thereof which is disposed within the channel 94 is prevented from extending beyond the confines of said channel, and thereby becomes further deformed in a manner to swing the ridges 95 outwardly and to bear considerable pressure against the interior surface 101 of the channel 94, thereby forcibly holding the mounting 95 in place in the chassis 93 with a force which may be greater than that of a conventional "force fit." This is achieved, however, by means of very little pressure on the part of the operator. Indeed, the operation requires merely the dropping into place, of the mounting 93, and the urging of the component 21 into its lowermost position within the mounting 95 by a simple manipulation of the finger. Moreover, when the mounting 95 is made of soft plastic, such for instance as polypropylene, nylon or butyrate, cold flow will take place, and a permanent setting is achieved.

We are aware that the invention may be embodied in other specific forms without departing from the spirit or essential attributes thereof, and we therefore desire the present embodiment to be considered in all respects as illustrative and not restrictive, reference being had to the appended claims rather than to the foregoing description to indicate the scope of the invention.

Having thus described our invention, what we claim as new and desire to secure by Letters Patent is:

1. A mounting for a vertical component having an outer wall, a bottom face, and a bottom lead extending downwardly from said bottom face, said mounting comprising:
   a base portion;
   A vertical channel adapted to receive said bottom lead;
   A platform adapted to support a portion of said bottom face other than the portion thereof through which said bottom lead extends;
   Members projecting upwardly from said base portion and comprising a plurality of inner faces adapted to bear against said outer wall of said component, at least one of said members being resilient and another of said members being substantially rigid, and a plurality of said inner faces being disposed on opposite sides of the vertical axis of said component.

2. A mounting for a vertical component as defined in claim 1, and further characterized by:
   The upper edge portion of one of said members being inwardly and downwardly inclined toward said longitudinal axis.

3. A mounting for a vertical component as defined in claim 1, and further characterized by:
   The upper edge portions of said members substantially defining the surface of an inverse cone whose apex is disposed along said vertical axis.

4. A mounting for a vertical component as defined in claim 1, and further characterized by:
   Said platform being spaced a substantial distance above the upper entrance to said channel.

5. A mounting for a vertical component as defined in claim 1, and further characterized by:
   Said platform being one of a plurality of platforms, each of which is mounted on a step, said steps defining therebetween a passageway for said bottom lead extending between said bottom face and said channel.

6. A mounting for a vertical component as defined in claim 1, and further characterized by:
   A plurality of said members being substantially rigid.

7. A mounting for a vertical component as defined in claim 1, and further characterized by:
   A plurality of said members being substantially rigid, and a web mounted on and extending between said rigid members.

8. A mounting for a vertical component as defined in claim 7, and further characterized by:
   Said web being formed integral with said resilient member.

9. A mounting for a vertical component as defined in claim 1, and further characterized by:
   A plurality of said members being substantially rigid, and a web mounted on and extending between said rigid members;
   Said web and said resilient and rigid members all being formed integral.

10. A mounting for a vertical component as defined in claim 1, and further characterized by:
    Said resilient member comprising a web disposed as an inwardly projecting fold having a bight whose inner face consists of one of said inner faces adapted to bear against said outer face of said component.

11. A mounting for a vertical component as defined in claim 10, and further characterized by:
    A restraining means disposed across said bight and adapted to limit the outward distension of said fold when said component is inserted in said mounting.

12. A mounting for a vertical component as defined in claim 1, and further characterized by:
    Said resilient member comprising a web disposed as an inwardly projecting fold having a bight whose inner face consists of one of said inner faces adapted to bear against said outer face of said component; and Said web and said rigid member being formed substantially integral.

13. A mounting for a vertical component as defined in claim 1, and further characterized by:

Said resilient member comprising a web disposed as an inwardly projecting fold having a bight whose inner face consists of one of said inner faces adapted to bear against said outer face of said component; and A passageway disposed between said web and said base portion and adapted to receive said bottom lead therebetween.

14. A mounting for a vertical component as defined in claim 1, and further characterized by:

Said channel being one of a plurality of vertical channels adapted to receive said bottom lead and to enable it to project downwardly beneath said base portion.

15. A mounting for a vertical component as defined in claim 1, and further characterized by:

A pin mounted in said base portion, projecting downwardly therefrom, and adapted to be secured to a device to which said mounting is to be attached.

16. A mounting for a vertical component as defined in claim 1, and further characterized by:

A downwardly faced bearing extending exteriorly of said mounting and spaced above said base portion a distance at least equal to the thickness of a chassis in a channel of which said mounting is adapted to be disposed.

17. A mounting as defined in claim 16, and further characterized by:

Said resilient member being formed of a material which is subject to cold flow.

18. A mounting for a vertical component having an outer wall, top and bottom end faces, a bottom lead extending downwardly from said bottom end face and an upper lead extending upwardly from said top end face and terminating in a reversely turned portion extending downwardly along and in spaced relation to said outer wall to provide the component with a pair of substantially parallel leads extending below the plane of the bottom end face of the component, said mounting comprising A base portion;
A vertical channel adapted to receive said bottom lead;
A platform adapted to support a portion of said bottom face other than the portion thereof through which said bottom lead extends;
Members projecting upwardly from said base portion and comprising a plurality of inner faces adapted to bear against said outer wall of said component, at least one of said members being resilient and another of said members being substantially rigid, and a plurality of said inner faces being disposed on opposite sides of the vertical axis of said component, and
A vertical hollow post projecting upwardly from said base portion and adapted to receive said upper lead.

19. A mounting for a vertical component as defined in claim 18, and further characterized by:

Said hollow post comprising a vertically disposed slot at the lower portion thereof, and adapted to permit said upper lead to be disposed therethrough and to project downwardly from said base portion in any of a plurality of positions.

20. A mounting for a vertical component as defined in claim 18, and further characterized by:

An insulating tube secured to said hollow post and projecting upwardly therefrom with the interior thereof in substantial registry with the interior of the upper end region of said hollow post;

Said tubing being adapted to receive said upper lead and to guide it into said hollow post.

References Cited
UNITED STATES PATENTS

| | | |
|---|---|---|
| 2,964,688 | 12/1960 | McAdam. |
| 2,994,806 | 8/1961 | McLaughlin. |
| 3,241,094 | 3/1966 | Harton _____ 339—193 X |

FOREIGN PATENTS

| | | |
|---|---|---|
| 1,213,316 | 10/1959 | France. |
| 872,071 | 7/1961 | Great Britain. |
| 930,613 | 7/1963 | Great Britain. |

LARAMIE E. ASKIN, *Primary Examiner.*